United States Patent
Kim et al.

(10) Patent No.: US 8,339,008 B2
(45) Date of Patent: Dec. 25, 2012

(54) STATOR FOAR ASPIRATION MOTOR, ASPIRATION MOTOR AND IN-CAR SENSOR USING THE SAME

(75) Inventors: Byoung Kyu Kim, Seoul (KR); Byoung Soo Kim, Gyeonggi-do (KR)

(73) Assignee: Amotech Co., Ltd., Incheon (KR)

( * ) Notice: Subject to any disclaimer, the term of this patent is extended or adjusted under 35 U.S.C. 154(b) by 532 days.

(21) Appl. No.: 12/450,675

(22) PCT Filed: Apr. 8, 2008

(86) PCT No.: PCT/KR2008/001978
§ 371 (c)(1),
(2), (4) Date: Jan. 20, 2010

(87) PCT Pub. No.: WO2008/123736
PCT Pub. Date: Oct. 16, 2008

(65) Prior Publication Data
US 2010/0141058 A1  Jun. 10, 2010

(30) Foreign Application Priority Data
Apr. 10, 2007 (KR) .................. 10-2007-0035295

(51) Int. Cl.
*H02K 1/00* (2006.01)
*H02K 3/00* (2006.01)
*H02K 19/26* (2006.01)
*H02K 21/00* (2006.01)
*H02K 23/40* (2006.01)

(52) U.S. Cl. ....... 310/194; 310/71; 310/90; 310/156.32; 310/156.37

(58) Field of Classification Search .................... 310/71, 310/194, 90, 156.32–156.37; *H02K 1/00, H02K 3/00, 19/26, 21/00, 23/40*
See application file for complete search history.

(56) References Cited

U.S. PATENT DOCUMENTS

| 5,822,846 A * | 10/1998 | Moritan et al. ........... 29/598 |
| 6,232,687 B1 * | 5/2001 | Hollenbeck et al. ....... 310/88 |
| 6,414,408 B1 * | 7/2002 | Erdman et al. .......... 310/68 R |

(Continued)

FOREIGN PATENT DOCUMENTS
JP   08047283   *  2/1996
(Continued)

OTHER PUBLICATIONS

Machine translation of KR 1020050103741, Kim, Nov. 2005.*

(Continued)

*Primary Examiner* — Quyen Leung
*Assistant Examiner* — Terrance Kenerly
(74) *Attorney, Agent, or Firm* — Rosenberg, Klein & Lee

(57) ABSTRACT

Provided are a stator for an aspiration motor, an aspiration motor and an in-car sensor using the same, in which a bobbin is integrally formed with a stator, to thus use an inexpensive insulation wire and enhance a productivity and lower an inferiority using an insert-molding technology. The stator for the aspiration motor includes a stator support plate, a support boss which is vertically extended from the central portion of the stator support plate, a bobbin which is bent and formed on the lateral surface of the support boss, and which is separated from the upper side surface of the stator support plate, to thereby provide a space, and a stator coil which is formed by making a wire wound in the space provided by the bobbin.

16 Claims, 10 Drawing Sheets

U.S. PATENT DOCUMENTS

| | | | |
|---|---|---|---|
| 7,023,116 B2 * | 4/2006 | Kuribara | 310/90 |
| 7,800,263 B2 * | 9/2010 | Horng et al. | 310/67 R |
| 2001/0045782 A1 * | 11/2001 | Lieu et al. | 310/67 R |
| 2002/0096961 A1 * | 7/2002 | Chuang et al. | 310/216 |
| 2002/0098725 A1 * | 7/2002 | Wallace et al. | 439/86 |
| 2004/0256933 A1 * | 12/2004 | Toyokawa et al. | 310/89 |
| 2005/0058559 A1 * | 3/2005 | Kasahara et al. | 417/423.7 |
| 2006/0163958 A1 * | 7/2006 | Yagi et al. | 310/71 |
| 2006/0290226 A1 * | 12/2006 | Ohkawa et al. | 310/194 |
| 2007/0007836 A1 * | 1/2007 | Hyun | 310/90 |

FOREIGN PATENT DOCUMENTS

| | | |
|---|---|---|
| KR | 10-2000-0044143 | 7/2000 |
| KR | 20-0296035 | 11/2002 |
| KR | 10-2004-0074604 | 8/2004 |
| KR | 10-2005-0103741 | 11/2005 |

OTHER PUBLICATIONS

Machine translation of KR 202005002550, Kim, Nov. 2002.*
Machine translation of JP08047283, Kurita et al., Feb. 1996.*

* cited by examiner

STATOR FOAR ASPIRATION MOTOR, ASPIRATION MOTOR AND IN-CAR SENSOR USING THE SAME

TECHNICAL FIELD

The present invention relates to a stator for an aspiration motor, an aspiration motor and an in-car sensor using the same, and more particularly, to a stator for an aspiration motor, an aspiration motor and an in-car sensor using the same, in which processes which are apt to raise an inferiority and lower productivity are simplified in a method of manufacturing a stator for a motor, to thereby enhance productivity, while causes which increase an inferiority are solved, to thereby lower an inferiority and to lower a productive unit cost.

BACKGROUND ART

In general, an in-car sensor is provided to measure indoor temperature in a car similarly to the purpose of providing a car indoor ventilator. The in-car sensor is installed in the rear surface of a grill or an instrument panel of the car. The in-car sensor employs an aspiration motor in order to inhale indoor air in the car.

FIG. 1A is a plan view of a general aspiration motor, and FIG. 1B is a cross-sectional view cut along a line X-X' of FIG. 1A.

FIGS. 1A and 1B illustrate an aspiration motor disclosed in the Korean Utility-model Registration No. 296035, respectively. If electric power is supplied to a stator coil 3 in the aspiration motor, a rotor 4 is made to rotate, in which the rotor 4 is located in the upper side of a stator 10, and includes a magnet 4a.

In addition, if the rotor 4 is rotated, an impeller 2 which is integrated with the rotor 4 is rotated in which a shaft 7 of the impeller 2 is supported by a sleeve 8 located at the center of the impeller 2. Therefore, air is inhaled from an inlet formed at the upper surface of a housing 1 and discharged through an outlet formed at the lateral surface of the housing 1, because of the revolution of the impeller 2.

In addition, the stator coil is fixed to the upper portion of a stator support plate 3a, and a back yoke 5 forming a magnetic circuit is fitted into a groove formed at the rear surface of the stator support plate 3a. A control printed circuit board (PCB) 6 which supplies a drive signal for the stator coil 3 is fixed on the bottom of the stator support plates 3a. The control PCB 6 is also fixed to the housing 1.

In addition, a boss 9 supports the sleeve 8, and a stopper 1a suppresses an excessive rise of the impeller 2.

The aspiration motor employs a brushless direct-current (BLDC) motor whose structure is simple and whose control performance is good. In particular, the aspiration motor employs a disc-shaped brushless direct-current (BLDC) motor of an axial gap structure having an air gap axially in order to make the aspiration motor thinner and more compact.

In addition, a position detection hall element detects polarity of an S-pole and an N-pole of the magnet rotor 4 and generates a switching signal of changing over a drive electric current for the stator coil 3 in a conventional brushless direct-current (BLDC) motor. By the way, since the position detection hall element is expensive, the conventional brushless direct-current (BLDC) motor employs a drive circuit having only one position detection hall element.

A method of manufacturing a stator for a general aspiration motor will be briefly described below.

A thermosetting resin coated wire (for example, a copper wire) is used and wound in a bobbinless method according to a desired form of a stator coil 3 (for example, a triangular form or the like) and then thermally treated, to thus mold the angular stator coil 3.

In addition, the stator coil 3 is seated into a groove which has been formed when molding a stator support plate 3a, and the stator coil 3 is primarily fixed to the stator support plate 3a, using an instantaneous adhesive. Then, ultra-violet (UV) thermosetting resin is coated on a number of portions of the lateral surface of the stator coil 3 (for example, three portions). Thereafter, the stator coil 3 coated with the ultra-violet (UV) thermosetting resin is dried using ultraviolet rays and fixed to stator support plate 3a.

Then, a dead point preventive back yoke 5 is combined with the rear surface of the stator support plate 3a. When combining the back yoke 5, a mutual regular direction and position should be set up between the back yoke 5 and the hall element. Otherwise, the hall element cannot detect polarity of the magnet 4a, due to the dead point, to thus cause a bad starting phenomenon of the aspiration motor.

That is, the back yoke 5 is formed of a hexagonal band, for example. A groove for fixing the back yoke 5 is formed on the rear surface of the stator support plate 3a. Then, the back yoke 5 is fixed to and fitted into the groove. The control PCB 6 is manually combined at a predetermined position so that a mutual regular direction and position should be set up between the hall element which is fixed on the control PCB 6 and the back yoke 5 which is fixed on the stator support plate 3a. As a result, it is difficult to set up an accurate direction and position of the back yoke 5 and the hall element.

In addition, the start/end wires of the stator coil 3 which has been fixed to the stator support plate 3a are withdrawn. Then, the withdrawn start and end wires are made to contact a printed circuit of the control PCB 6 which is combined to the lower surface of the stator support plate 3a through a plurality of throughholes formed on the stator support plate 3a, and are connected and fixed thereto using a soldering method.

In addition, a bearing seat (not illustrated) which closely contacts a shaft 7 is inserted into the lower side of the central hole which is formed at the central portion of the stator support plate 3a and into which the shaft 7 of the rotor 4 is inserted, and then the shaft 7 is inserted thereinto.

Since the stator support plate 3a is molded using a bobbinless method in the conventional aspiration motor shown in FIGS. 1A and 1B, an expansive thermosetting resin coated wire should be used. As a result, a manufacturing cost of the conventional aspiration motor is risen. In addition, the stator 3 is formed using processes of: winding and molding the stator coil 3; fixing and bonding the lower surface of the stator coil 3 on the stator support plate 3a; coating UV thermosetting resin on a number of portions of the lateral surface of the stator coil 3; and drying using ultraviolet rays. As a result, the processes of manufacturing the stator 10 are very complicated.

Further, the process of fixing the stator coil 3 to the stator support plate 3a, the process of withdrawing the start/end wires of the stator coil 3 and making the withdrawn start/end wires contact the control PCB 6, and the process of inserting the bearing seat are all accomplished manually. As a result, accuracy of an assembly process drops, and productivity is also lowered.

Further, a mutual regular direction and position shall be set up between the back yoke 5 and the hall element lest the hall element should not be positioned at the dead point where the hall element does not detect polarity of the magnet 4a, so as to not cause a bad starting phenomenon of the aspiration motor.

However, since the back yoke 5 is combined with the lower portion of the stator support plate 3a and then combined with the control PCB 6 where the hall element is located, a case frequently occurs that the back yoke 5 and the hall element cannot be positioned at a respectively predetermined direction and position. As a result, an inferiority increases at the time of manufacturing aspiration motors.

The Korean Utility-model Registration No. 296035 has proposed a method of minimizing cogging noise and improving an assembly performance of a back yoke in an aspiration motor. However, a stator for an aspiration motor and a number of parts forming the aspiration motor are manually assembled and manufactured. Accordingly, a proposal capable of solving the problem that an accuracy and productivity are lowered has never been presented.

DISCLOSURE

Technical Problem

To solve the above problems, it is an object of the present invention to provide a stator for an aspiration motor, an aspiration motor and an in-car sensor using the same, in which a bobbin is integrally formed on a stator support plate, and a generally inexpensive insulation wire is used for and wound directly around the bobbin, to thereby simplify a process of manufacturing the stator for the aspiration motor and enhance a productivity of the aspiration motor, as well as lowering a manufacturing cost therefor.

It is another object of the present invention to provide a stator for an aspiration motor, which is formed by minimizing manual processes such as a process of molding a wound coil and a process of fixing the wound coil among processes of forming the stator for the aspiration motor, to thereby enhance a productivity of the stator and minimize an inferiority of the stator.

It is still another object of the present invention to provide an aspiration motor, in which a hall element is inserted at a position to be set up according to a direction of a magnetic circuit formed at a back yoke of a stator, to thus prevent a bad starting phenomenon which occurs when the hall element cannot detect polarity of a magnet.

It is yet another object of the present invention to provide an in-car sensor, which increases productivity of an aspiration motor used in the in-car sensor similarly to the purpose of providing a car indoor ventilator, and minimizes a manufacturing cost and an inferiority of the aspiration motor, to thereby minimize a manufacturing cost of the in-car sensor.

Technical Solution

To accomplish the above object of the present invention, according to an aspect of the present invention, there is provided a stator for an aspiration motor, the stator comprising:

a stator support plate;

a support boss which is vertically extended from the central portion of the stator support plate;

a bobbin which is bent and formed on the lateral surface of the support boss, and which is separated from the upper side surface of the stator support plate, to thereby provide a space; and a stator coil which is formed by making a wire wound in the space provided by the bobbin.

Preferably but not necessarily, the stator for the aspiration motor further comprises: a bearing seat which is inserted into the stator support plate, and is located at the lower portion of the central hole which is formed in the support boss, to thereby isolate a sealing at the lower portion of the central hole; a back yoke which is located on the outer circumference of the bearing seat and forms a magnetic circuit; and a hall element whose position is set so as to be shifted by ¼ from the corner of the back yoke and the boundary surface of polarity.

Preferably but not necessarily, the stator support plate is formed by position-setting, inserting and molding at least one of the bearing seat, the back yoke and the hall element, in an insert-molding method using thermosetting resin.

Preferably but not necessarily, the stator for the aspiration motor further comprises: a sleeve which is installed in the inside of the central hole formed in the support boss and grease which is filled between the sleeve and the bearing seat.

Preferably but not necessarily, a number of parts are fixed for preventing an insulation wire from being loosened at a state where the insulation wire is wound in the space provided by the bobbin.

Preferably but not necessarily, the stator support plate comprises a number of terminal insertion holes which can be respectively combined with coil terminals at one side portion of the stator support plate, in which each of the coil terminals comprises: a number of pins which are penetratively combined with the terminal insertion holes, and which are soldered and connected to a control printed circuit board (PCB) which is combined with the bottom surface of the stator support plate; and a terminal having grooves which are respectively extended from the pins in order to connect the start/end wires withdrawn from the stator coil.

Thus, according to the present invention, the stator coil is not separately fabricated when the stator for the aspiration motor is produced, nor the stator coil is manually attached on the stator support plate using an adhesive but a wire is wound in the space formed by the bobbin, to thereby form a stator coil using a comparatively inexpensive insulation wire.

Further, manual processes in a conventional method of producing a stator, that is, a process of adhering the stator coil on the stator support plate, and a process of combining a back yoke are omitted, to thereby enhance a productivity and lower an inferiority.

Still further, according to the present invention, the back yoke and the hall element are inserted at positions which are set according to a direction of a magnetic circuit, to thus injection-mold a stator in an insert-molding method, and prevent a bad starting phenomenon which may occur when a hall element cannot detect polarity of a magnet by a dead point.

Still further, a handwork which is difficult to withdraw the wires in order to connect the stator coil to the control PCB, and to connect the withdrawn wires with the control PCB via the throughholes is omitted, the wires are easily wound the terminals using a plurality of coil terminals, and the penetrated pins are soldered and connected with the PCB, to thereby enhance a productivity.

According to another aspect of the present invention, there is also provided a stator for an aspiration motor, the stator comprising:

a stator support plate in which a bearing seat in which a number of terminal insertion holes are formed in first and second areas, respectively, and whose position is set up at the lower portion of the central portion thereof, a back yoke which is located on the outer circumference of the bearing seat and a hall element are inserted at predetermined positions according to a magnetic circuit formed by the back yoke;

a support boss which is vertically extended from the central portion of the stator support plate;

a bobbin which is bent and formed on the lateral surface of the support boss, and which is integrated with the stator support plate, to thereby provide a space in which a wire is wound;

a stator coil which is formed by making a wire wound in the space provided by the bobbin; and a control printed circuit board (PCB) which is combined with the bottom surface of the stator support plate and supplies a drive signal to the stator coil.

Preferably but not necessarily, the stator for the aspiration motor further comprises a pair of coil terminals at the upper portion of which start and end wires withdrawn from the stator coil are fixed, and at the lower portion of which the respective terminal insertion holes are combined and the control PCB is connected.

According to still another aspect of the present invention, there is also provided an aspiration motor comprising:

a rotor in which an impeller and a shaft are integrally formed with a magnet, and which inhales and exhales air according to rotation of the magnet and the impeller; and a stator which comprises a stator coil whose shaft is rotatably combined with the central portion of the support boss which is vertically extended from the central portion of the stator support plate opposing the rotor, and which is wound around a bobbin which is bent and extended on the lateral surface of the support boss.

Preferably but not necessarily, the stator comprises: a circular bearing seat which is located at the lower portion of the central hole formed in the support boss; a hexagonal back yoke which is located on the outer circumference of the bearing seat and which forms a magnetic circuit; and a hall element whose position is set up according to the magnetic circuit.

Preferably but not necessarily, the stator is integrally formed by injection-molding at least one of the bearing seat, the back yoke and the hall element, in an insert-molding method on the stator support plate.

Preferably but not necessarily, the aspiration motor further comprises: first and second coil terminals having a number of pins which are penetrated through a number of terminal insertion holes which are provided on the stator support plate, and terminals around which start and end wires which are withdrawn from the stator coil are wound; and a control printed circuit board (PCB) which is combined with the bottom surface of the stator support plate and supplies a drive signal for the stator coil, wherein each pin is connected with the control PCB which is combined with the bottom surface of the stator support plate by soldering, and the drive signal supplied by the control PCB is applied to the stator coil.

According to yet another aspect of the present invention, there is also provided an in-car sensor comprising:

a rotor in which an impeller and a shaft are integrally formed with a magnet, and which inhales and exhales car indoor air according to rotation of the magnet and the impeller;

a stator which comprises a stator coil whose shaft is rotatably combined with the central portion of the support boss which is vertically extended from the central portion of the stator support plate opposing the rotor, and which is wound around a bobbin which is bent and extended on the lateral surface of the support boss;

a control printed circuit board (PCB) which is combined with the bottom surface of the stator support plate and supplies a drive signal for the stator coil;

a housing which is fixedly combined with a car while forming an external appearance, and which has an air-stream path from an inlet of the leading end of the housing to an outlet formed at the lateral surface thereof, and upper and lower housings which fix the control PCB in the housing;

a temperature sensor which is positioned in the air-stream path through which air is inhaled by the rotor; and a signal PCB which transfers a signal detected by the temperature sensor to a controller of the car.

Preferably but not necessarily, the in-car sensor further comprises a signal terminal which is connected with the signal PCB and which transfers the signal detected by the temperature sensor to the controller of the car.

Preferably but not necessarily, the signal terminal comprises a number of terminal pins each of which one side is connected with the signal PCB and other side is connected with the controller, to thus transfer the signal detected by the temperature sensor to the controller; and a fixing member for integrally fixedly supporting the signal terminal to the in-car sensor.

Preferably but not necessarily, the lower housing comprises connector insertion grooves into which a 6-pin connector can be easily combined, in which the 6-pin connector is connected with the controller at an area through which each terminal pin of the signal terminal is penetrated and protruded.

ADVANTAGEOUS EFFECTS

As described above, according to the present invention, a bobbin around which a wire is wound is formed on the lateral surface of a stator support plate. An expensive thermosetting resin coated wire is not used but an inexpensive insulation wire is wound to thus form a stator. As a result, a manufacturing cost for a stator of an aspiration motor and an aspiration motor using the same is greatly lowered.

In addition, according to the present invention, one or at least one of a back yoke, a bearing seat and a hall element is inserted and molded into a stator support plate for used in an aspiration motor in an insert-molding method. As a result, a process of manufacturing the aspiration motor is simplified to thus enhance a productivity and minimize an inferiority.

Further, according to the present invention, a stator is inserted and molded by inserting a back yoke and a hall element at predetermined positions, to thus prevent a bad starting phenomenon which occurs when the hall element cannot detect polarity of a magnet.

Still further, according to the present invention, a coil terminal is combined on a stator support plate, and thus start/end wires of the stator coil are wound around the coil terminal, and pins of the coil terminal are connected with a control PCB. Accordingly, the present invention can enhance a better productivity of an aspiration motor stator and an aspiration motor than that of the conventional method of manually inserting start/end wires into throughholes of the control PCB.

Yet further, according to the present invention, a manufacturing cost and an inferiority of an aspiration motor using an aspiration motor can be lowered. In addition, an electrical connection of a controller in a car with an in-car sensor thereof can be easily performed.

DESCRIPTION OF DRAWINGS

The above and other objects and advantages of the present invention will become more apparent by describing the preferred embodiments thereof in detail with reference to the accompanying drawings in which.

BEST MODE

Figure 1A:
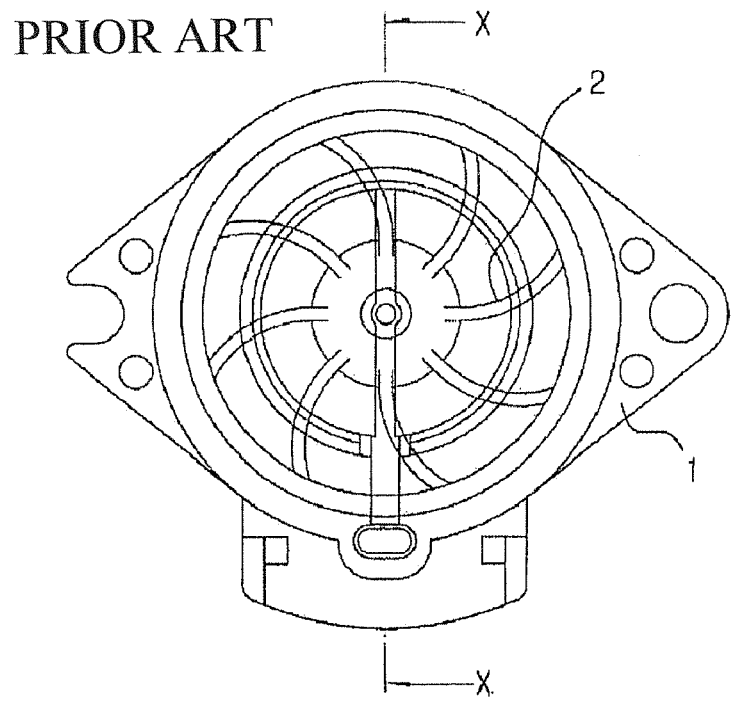
FIG. 1A is a plan view of a general aspiration motor.
Figure 1B:
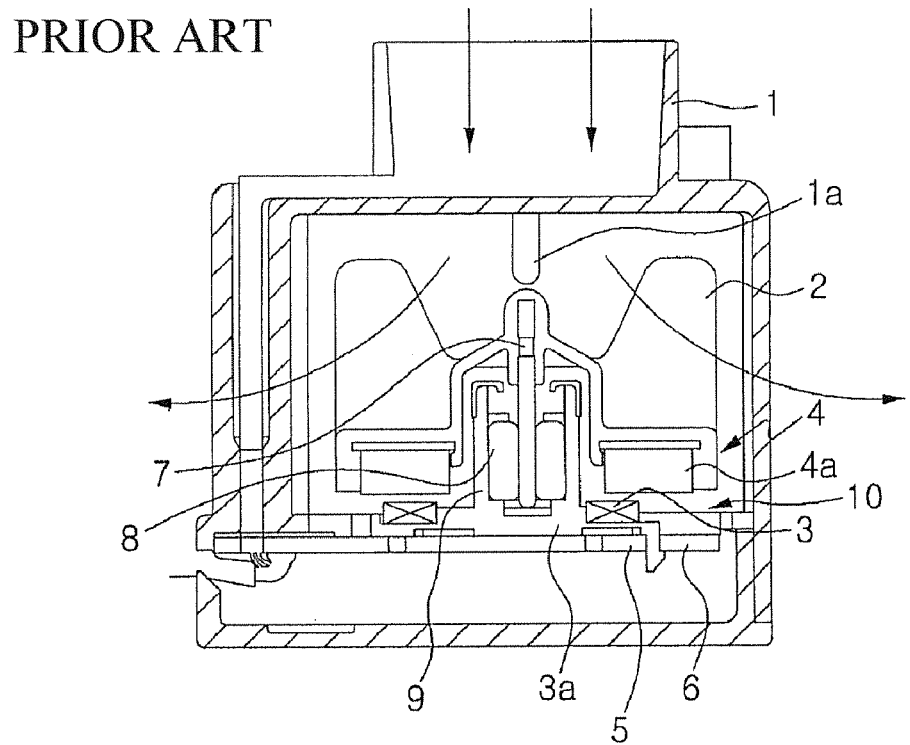
FIG. 1B is a cross-sectional view cut along a line X-X' of FIG. 1A.

Hereinbelow, a stator for an aspiration motor, an aspiration motor and an in-car sensor using the same according to a preferred embodiment of the present invention will be described with reference to the accompanying drawings. Like reference numerals denote like elements through the following embodiments.

Referring to FIGS. 2A to 2E, an in-car sensor 40 is assembled using an aspiration motor according to the present invention.

Figure 2A:
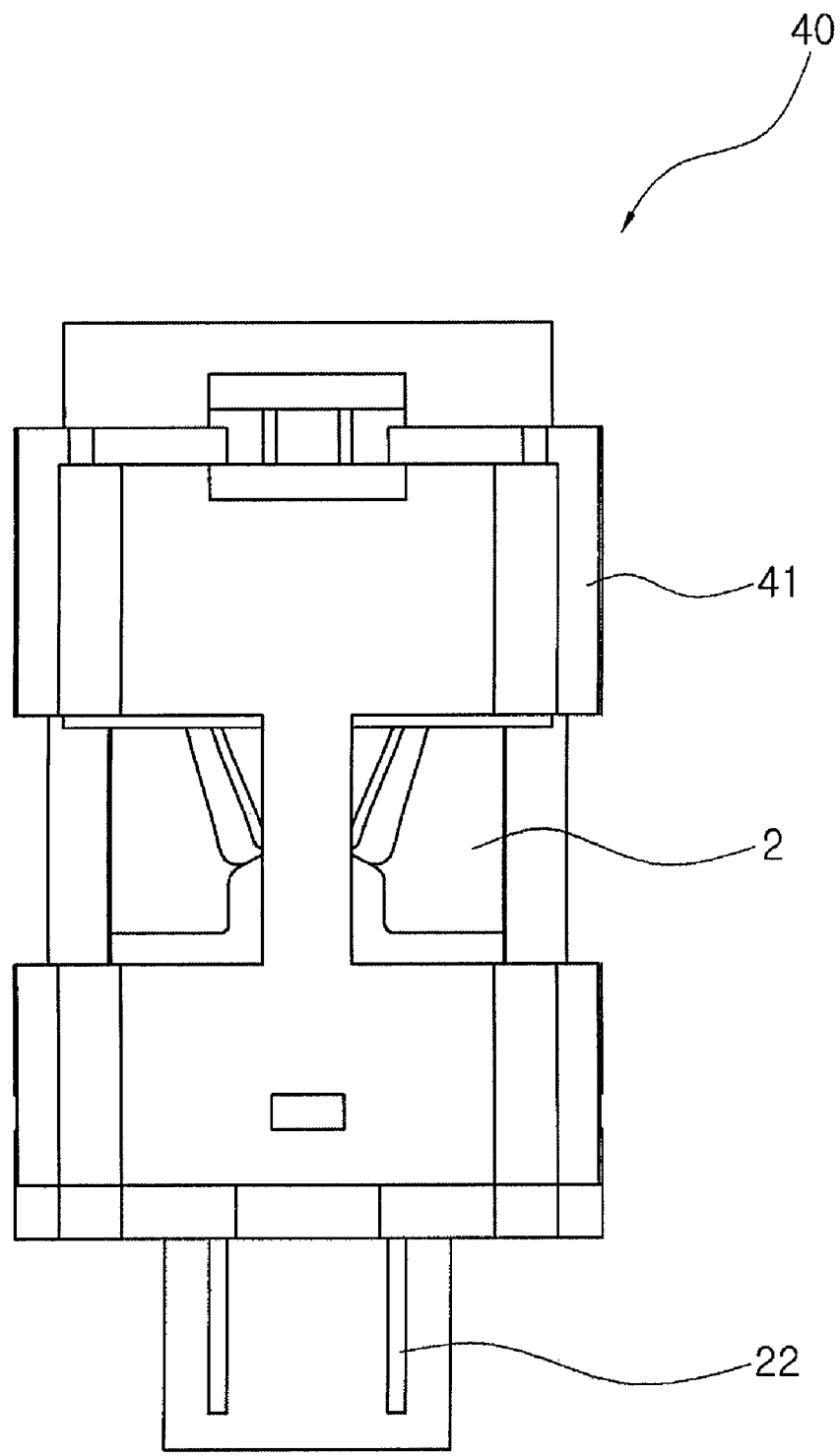
FIG. 2A is a front view of an in-car sensor which is assembled using an aspiration motor according to the present invention.
Figure 2B:
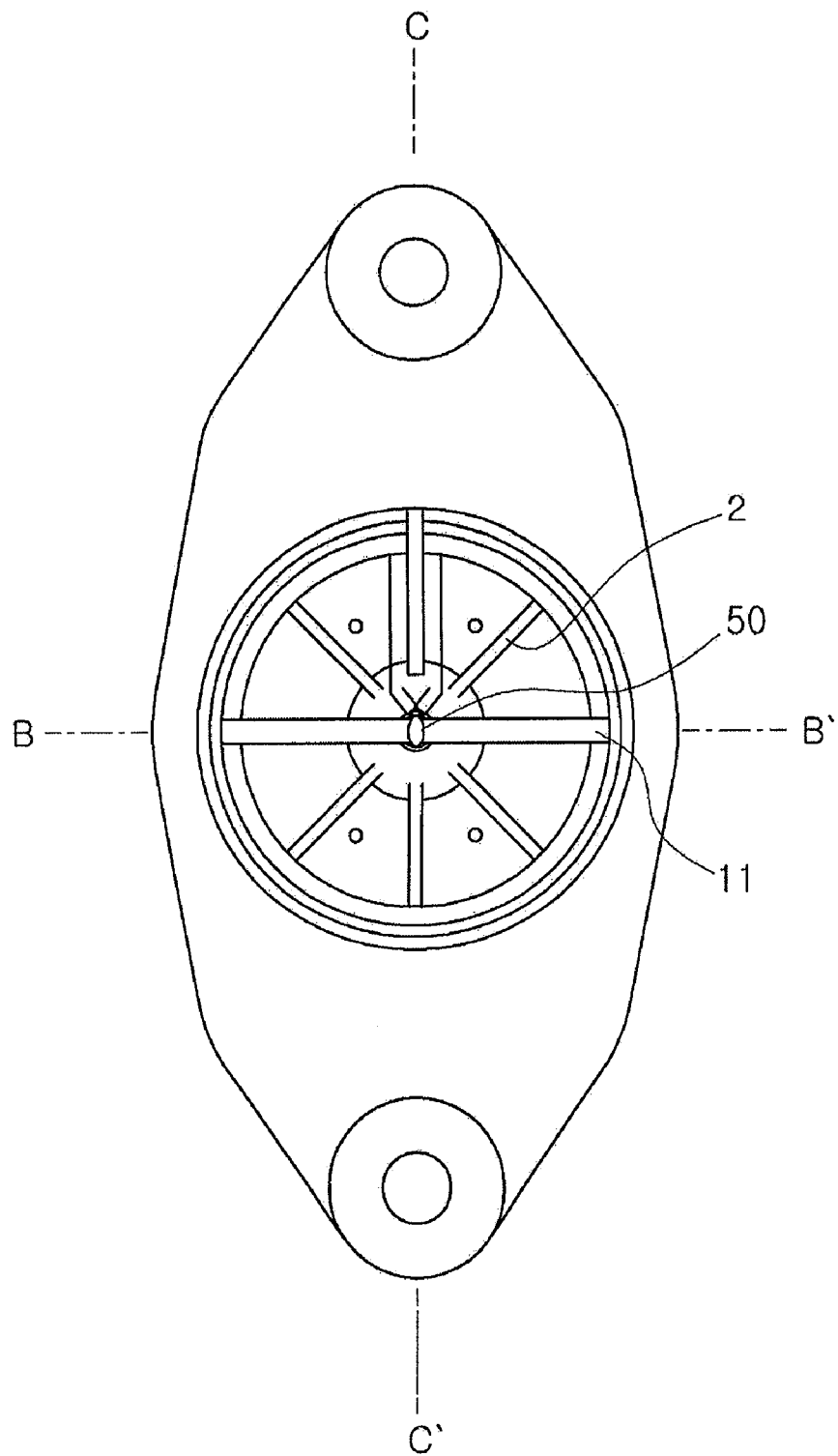
FIG. 2B is a plan view of an in-car sensor which is assembled using an aspiration motor according to the present invention.
Figure 2C:
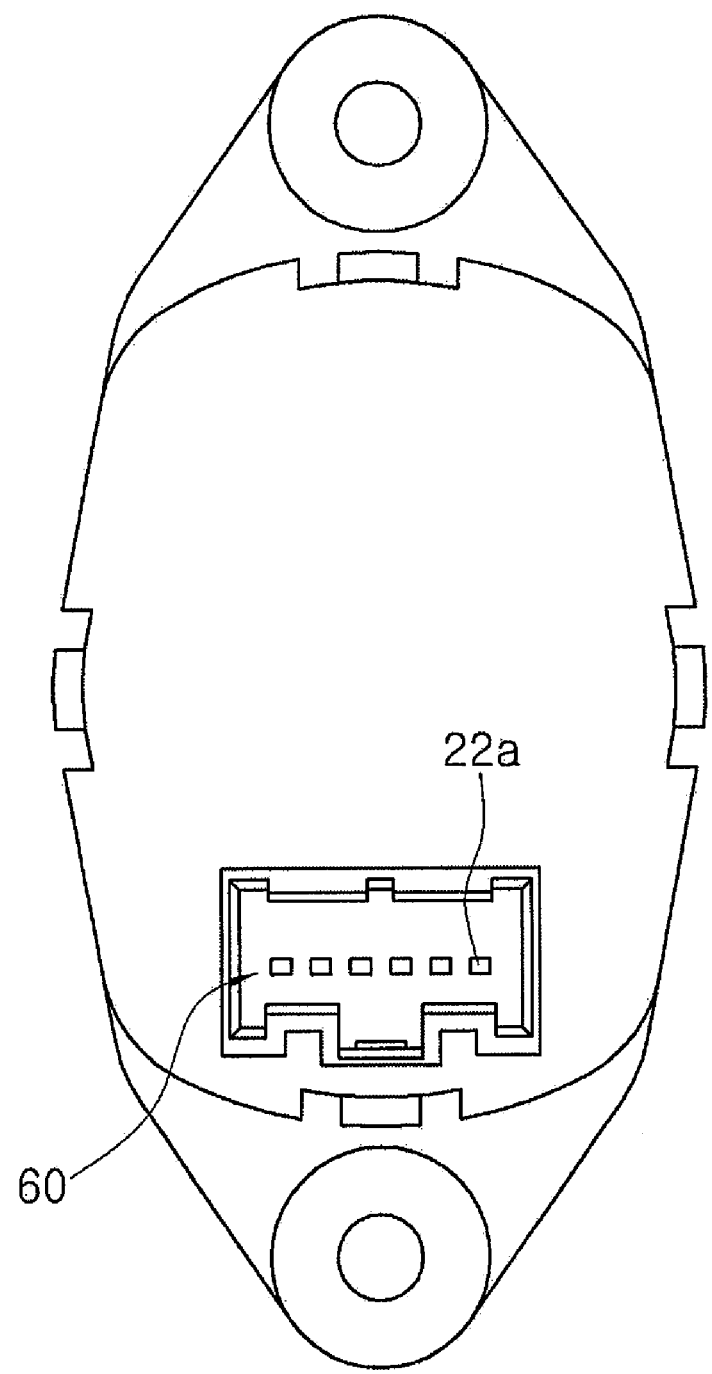
FIG. 2C is a rear view of an in-car sensor which is assembled using an aspiration motor according to the present invention.
Figure 2D:
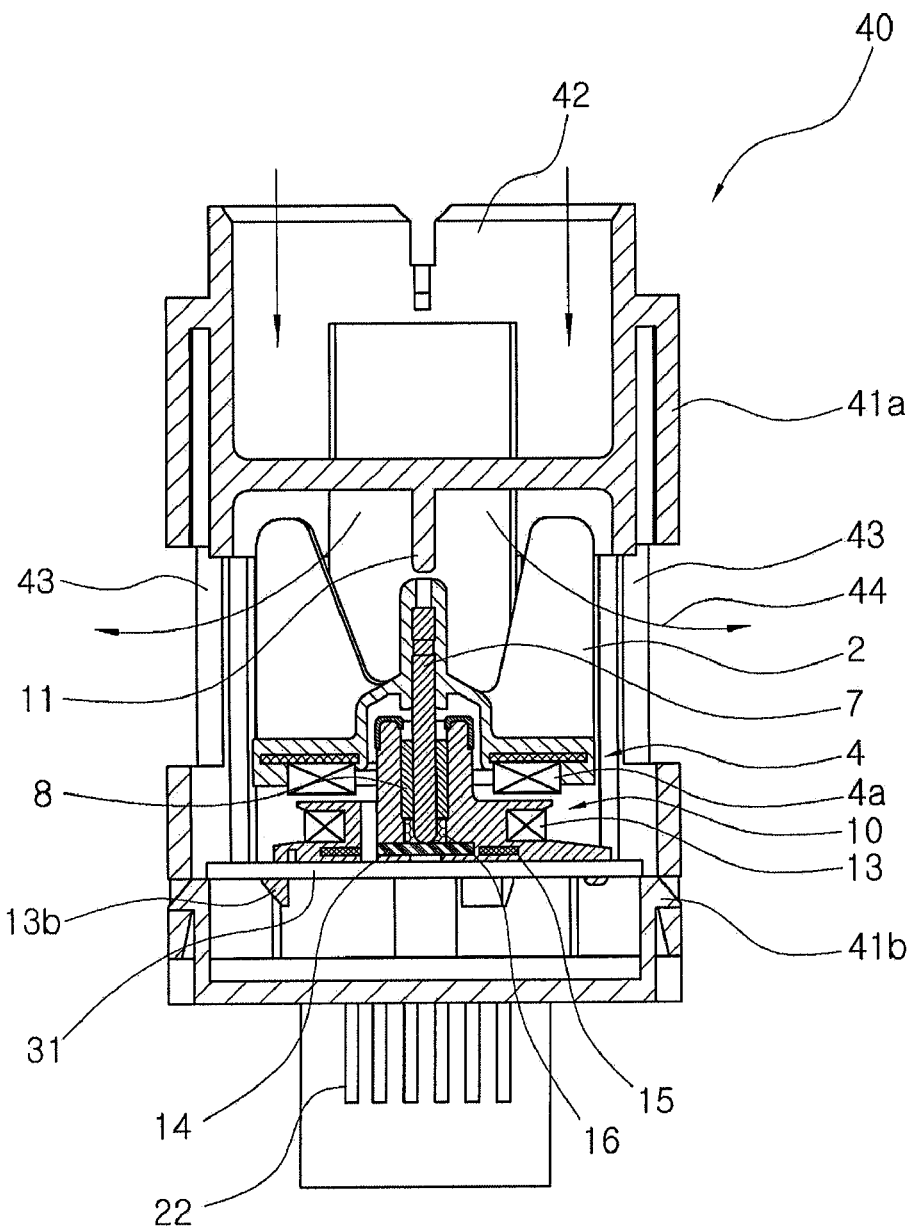
FIG. 2D is a cross-sectional view cut along a line B-B' of FIG. 2B.
Figure 2E:
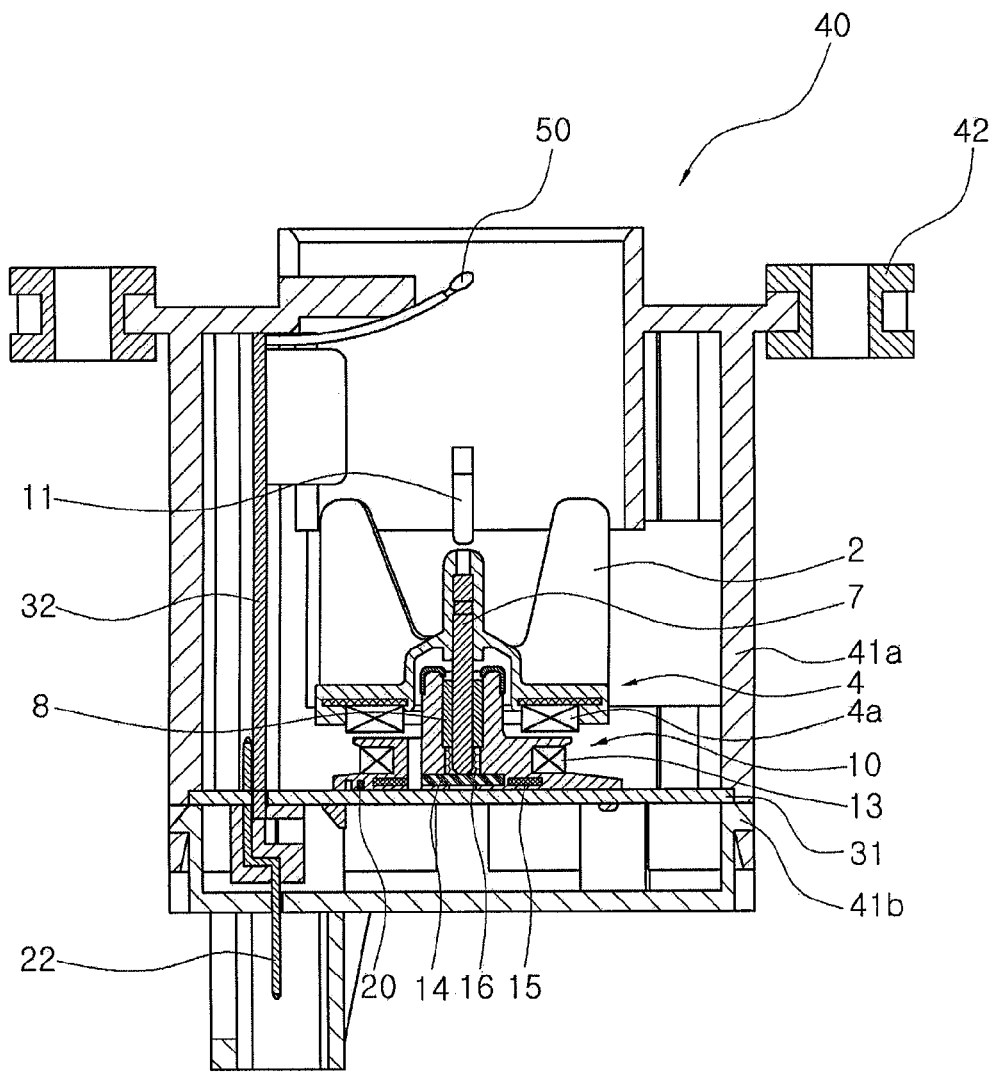
FIG. 2E is a cross-sectional view cut along a line C-C' of FIG. 2B.

As shown in FIG. 2D, an inlet 42 through which air (for example, car indoor air) is inhaled is provided at the upper portion of the in-car sensor 40 and an outlet 43 through which air which has been inhaled through the inlet 42 is discharged is provided at the lateral portion of the in-car sensor 40.

That is, air is inhaled/discharged through an air-stream path 44 which is formed between the inlet 42 through which air is inhaled and is provided at the upper portion of the in-car sensor 40 and the outlet 43 through which air which has been inhaled through the inlet 42 is discharged and is provided at the lateral portion of the in-car sensor 40. Here, a number of outlets 43 may be formed at the lateral portion of the in-car sensor 40.

In addition, the in-car sensor 40 includes: upper and lower housings 41a and 41b which form an external appearance of the in-car sensor 40; a temperature sensor 50 which senses temperature of air which is inhaled via an inlet 42 and discharged through an outlet 43; a signal printed circuit board (PCB) 32 which is located at one lateral surface of the in-car sensor 40 and transfers a signal detected by the temperature sensor 50 to a controller (for example, a car ventilation control system) of a car; and a signal terminal 22 which contacts the signal PCB 32 and which transfers the signal detected by the temperature sensor 50 to the controller of the car.

In addition, the in-car sensor 40 includes an aspiration motor 30 which includes a stator 10 and a rotor 4 in order to inhale and discharge air.

The detailed description of the aspiration motor 30 will be described later.

Meanwhile, the temperature sensor 50 can be implemented as a thermistor. The temperature sensor 50 is located on the inlet 42 through which air is inhaled according to rotation of an impeller 2 based on driving of the aspiration motor 30. The signal PCB 32 processes functions of transferring a temperature value sensed by the temperature sensors 50 or sensing a humidity and is located in the inside of one side of the housing 41.

A pair of flanges 42 are used when the in-car sensor 40 is fixed to a pair of bosses which are protruded on the rear surface of a car grill, using fixing screws. The pair of the flanges 42 are protruded to both sides of the upper portion of the upper housing 41a. A circular grommet made of rubber is combined with each flange 42, and is used for absorbing noise and vibration.

In addition, the signal PCB 32 is in contact with the signal terminal 22, and transfers a signal to a controller of a car through the signal terminal 22.

Figure 3A:
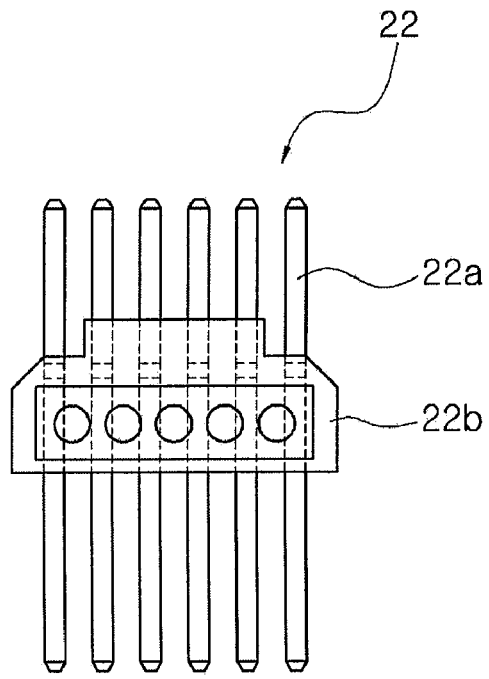
FIGS. 3A and 3B are a front view and a side view of a signal terminal, respectively.
Figure 3B:
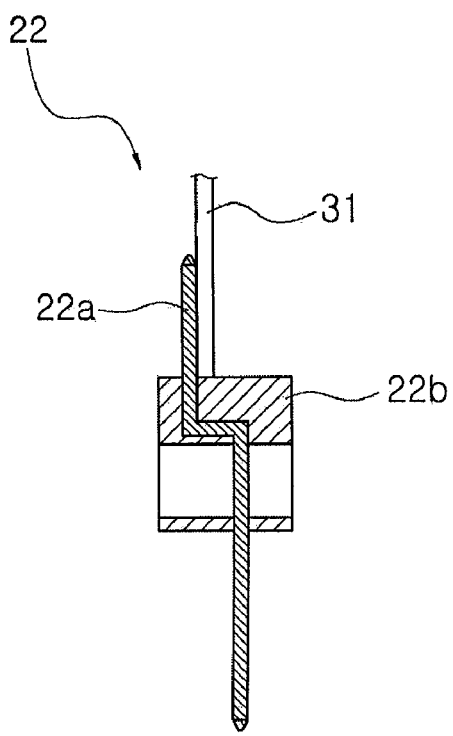

FIGS. 3A and 3B are a front view and a side view of a signal terminal, respectively.

Referring to FIGS. 3A and 3B, the signal terminal 22 includes a number of terminal pins 22a and a fixing member 22b for integrally fixedly supporting the respective terminal pins 22a.

The signal terminal 22 is fixed in a manner that the terminal pins 22a are fixed to a control PCB 31, by soldering, and part of the number of terminal pins 22a come in contact with the signal PCB 32, so that a temperature sensed signal is transferred to a controller from the signal PCB 32. The remaining terminal pins 22a come in contact with the control PCB 31, so that the control PCB 31 controls an aspiration motor to be driven.

In addition, as shown in FIG. 2C, a connector insertion groove 60 is formed at the lower portion of the lower housing 41b, so that a general-purpose 6-pin connector can be combined at the portions where the respective terminal pins 22a are protruded. Accordingly, an electrical connection is easily accomplished between the controller of the car and the in-car sensors 40.

Hereinbelow, a configuration of an aspiration motor 30 according to the present invention will be described in detail with reference to FIG. 4.

Figure 4:
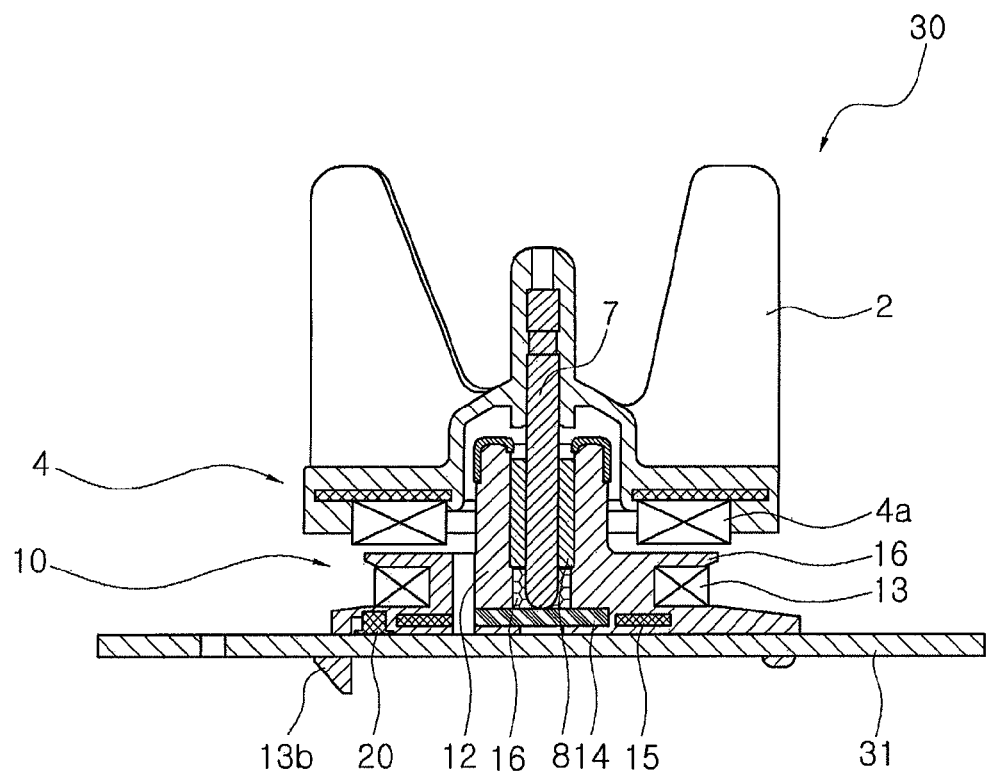
FIG. 4 is a sectional view showing with a configuration of an aspiration motor according to the present invention.
Figure 5A:
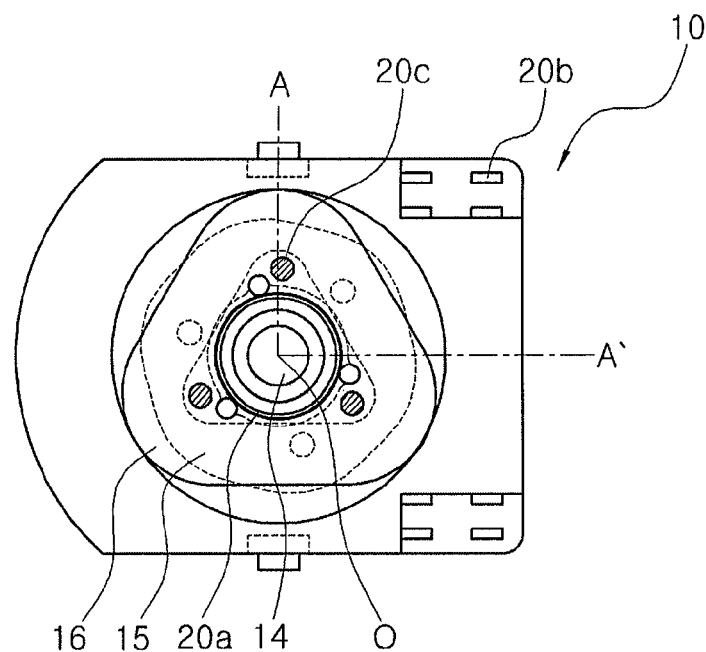
FIG. 5A is a plan view showing a stator for an aspiration motor according to a preferred embodiment of the present invention.
Figure 5B:
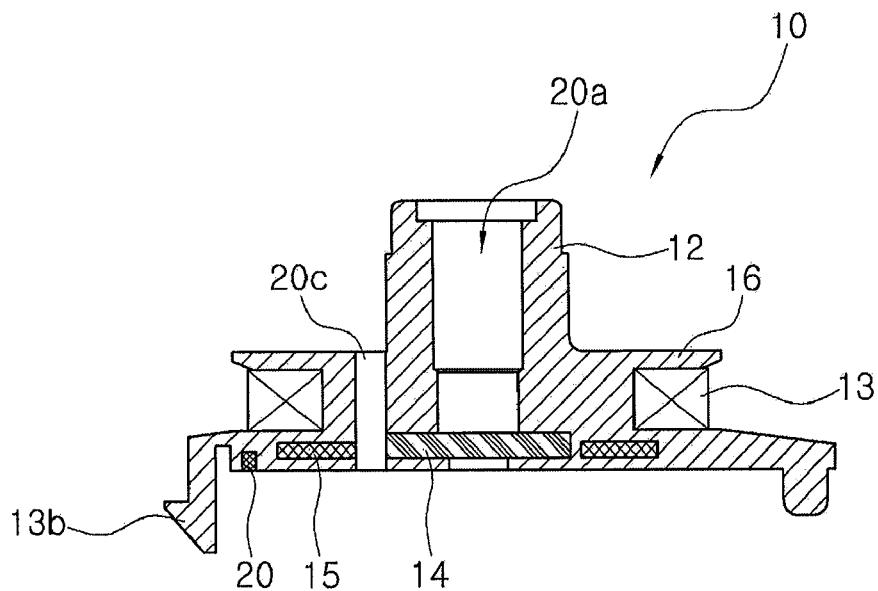
FIG. 5B is a cross-sectional view cut along a line A-O-A' of FIG. 5A.

Referring to FIG. 4, the aspiration motor 30 is configured in a manner that a sleeve 8 for supporting a shaft 7 is positioned at the central hole 20a (of FIG. 5A) on the stator support plate 13a (of FIG. 5C), and the shaft 7 is inserted into and combined with the central hole 20a. A rotor 4 is integrally combined with the shaft 7. The rotor 4 includes a 6-pole magnet 4a which is formed of a division magnetization or piece method, for example.

In addition, if electric power is applied to the stator coil 13 of the aspiration motor 30, the rotor 4 located in opposition to the stator coils 13 is made to rotate, and an impeller 2 which is integrally formed with the rotor 4 is supported and rotated by the shaft 7 and the sleeve 8 located at the central portion of the aspiration motor 30. Accordingly, air is inhaled/discharged according to the rotation of the impeller 2.

Grease 17 is filled in a space among the stator support plate 13a, the shaft 7 and the sleeve 8, in order to decrease a frictional coefficient according to the rotation of the shaft 7.

In addition, the control PCB 31 which supplies a drive signal to the stator coils 13 is fixedly combined by a coupling hook 13b which is formed on the bottom surface of the stator support plate 13a.

Meanwhile, if electric power is interrupted for the aspiration motor 30, or a drive signal for the stator coil 13 is interrupted from the control PCB 31, the rotor 4 stops rotating. Here, since a hall element 20 and a back yoke 15 have been already injection-molded at predetermined positions, the hall element 20 is not located at a dead point.

That is, as a hall element 20 is placed at a position which is shifted by about 15 degrees from the corners of a hexagonal back yoke 15 and the boundary surfaces of magnetic poles of the magnet 4, the hall element 20 is not located at a dead point where the hall element 20 cannot detect polarity of the magnet 4.

Meanwhile, a bearing seat 14 which is located at the lower portion of the central hole 20a to interrupt sealing of the central hole 20a, and the back yoke 15 and the hall element 20 which form a magnetic circuit are inserted at predetermined positions in the aspiration motor 30. A stator 10 is injection-molded in an insert-molding method in which a bobbin 16 is bent and extended on the lateral surface of the stator 10. An insulation wire is wound in a space which is provided in the stator 10 by the bobbin 16, to thereby form a stator coil 13.

Figure 5C:
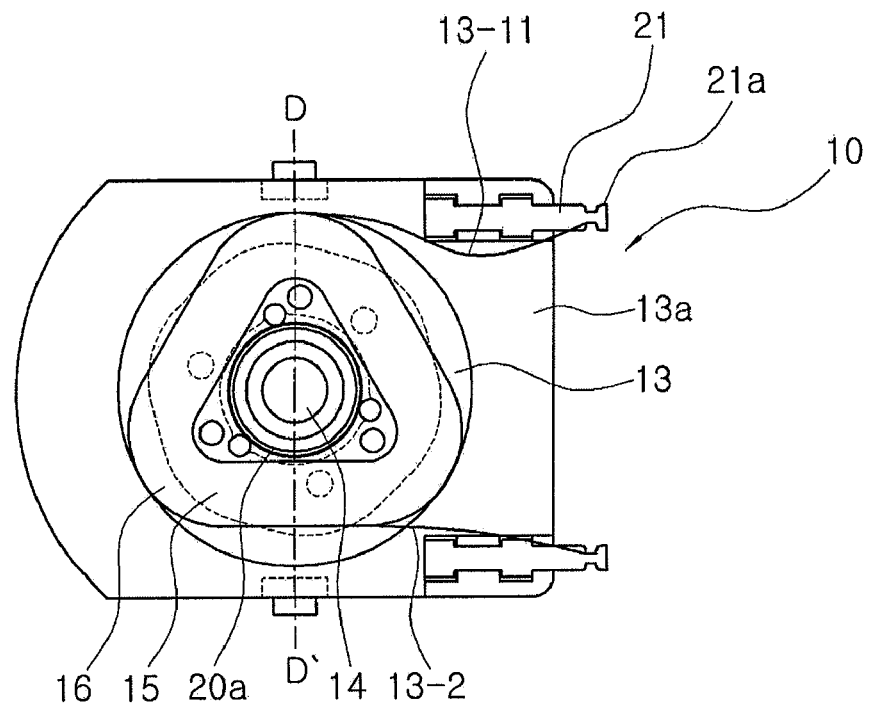
FIG. 5C is a plan view showing a state where a coil terminal and a control PCB are combined with a stator for an aspiration motor according to a preferred embodiment of the present invention.

In addition, a pair of coil terminals 21 are combined with the stator support plate 13a, and the start/end wires of the stator coil 13 are withdrawn and the withdrawn start/end wires are connected with a terminal 21a of each coil terminal 21 (see FIG. 5C). Then, the control PCB 31 is fixed and combined with the bottom surface of the stator support plate 13a.

Here, pins 22 of each coil terminal 21 are inserted through the throughholes prepared on the control PCB 31, and the pins 22 and the hall element 20 are connected with the printed circuit by soldering.

The stator coil 13 is formed by winding an insulation wire around the bobbin 16 formed at the lateral surface of the stator support plate 13a. The magnet 4a of the rotor 4 is positioned and combined in opposition to the stator coil 13.

A predetermined amount of grease 17 is filled in the central hole 20a of stator 10, and then the sleeve 8 supporting the shaft 7 and the shaft 7 are inserted into and combined with the central hole 20a of stator 10.

The control PCB 31 is combined with the bottom surface of the stator support plate 13a, and the shaft 7 is inserted into the central hole 20a so that the stator coil 13 and the magnet 4a of the rotor 4 oppose each other. Then, the aspiration motor 30 is combined with a housing 41 including the upper housing 41a and the lower housing 41b.

Here, the outer circumference of the control PCB 31 which is fixed at the bottom surface of the stator support plate 13a is snap-combined into the groove of the lower housing 41b at a state where the outer circumference of the control PCB 31 has been inserted into the groove of the upper housing 41a. Accordingly, the aspiration motor 30 can be compressed and fixed between the upper housing 41a and the lower housing 41b.

A stator for an aspiration motor according to the present invention will be described below in detail, with reference to FIGS. 5A to 5D.

Referring to FIGS. 5A to 5D, a stator 10 for an aspiration motor, includes: a stator support plate 13a; a support boss 12 which is vertically extended from the central portion of the stator support plate 13a; a bobbin 16 which is bent and formed on the lateral surface of the support boss 12, and which is separated by a predetermined distance from the upper side surface of the stator support plate 13a, to thereby provide a space; and a stator coil 13 which is formed by making an insulation wire wound in the space provided by the bobbin 16 and the stator support plate 13a.

The stator 10 includes a number of contraction preventive holes 20c which are provided in the stator support plate 13a in order to prevent a molding material from be shrunk to avoid an inferiority at the time of injection molding, a central hole 20a which is formed in the support boss 12 and through which the shaft of the rotor 4 is inserted, and a number of terminal insertion holes 20b through which pins of a pair of coil terminals are inserted.

A bearing seat 14 which closely contacts the shaft 7, for example, which is circularly formed is position at the lower portion of the central hole 20a, and a back yoke 15 whose inner and outer circumferences are substantially hexagonal is positioned at the outer side of the bearing seat 14.

In addition, the hall element 20 is inserted and installed so that the lower end matches the lower surface of the stator support plate 13a, so as to come in contact with the control PCB 31, and is position-set up lest the hall element 20 should not be located at a dead point where the hall element 20 cannot detect polarity of the rotor 4 according to direction of a magnetic circuit formed by the back yoke 15.

In addition, the lateral outer circumferential shape of the support boss 12 and the shape of the bobbin 16 can be decided according to a form of the preset stator coil 13. If the stator coil 13 is triangular for example, the lateral outer circumferential shape of the support boss 12 and the shape of the bobbin 16 are formed in the form of a triangle, respectively. Accordingly, the stator coils which is formed by winding a wire in a space which is formed by the bobbin 16 is made to become triangular.

The stator 10 for the aspiration motor according to the present invention guides the wire when the wire which forms the stator coil 13 is wound on the lateral surface of the stator 10 at the time of injection-molding. The stator 10 is integrated with the bobbin 16 which provides the space for winding the wire. That is, the stator coil 13 is not separately wound and formed, but the wire is directly wound on the stator 10, to thus form the stator coil 13, in the present invention.

That is, the bobbin 16 is integrally formed on the lateral surface of the stator support plate 13a. An expensive thermosetting resin coated wire is not used but a comparatively inexpensive insulation wire is wound in a space provided by the bobbin 16 to thus form a stator coil 13. As a result, a productivity of manufacturing the stator 10 of the aspiration motor 30 can be enhanced, and a manufacturing cost therefor is greatly lowered as well.

If the bobbin 16 is integrally formed on the lateral surface of the stator support plate 13a, according to the present invention and an insulation wire is wound around the bobbin 16, to thus form a stator coil 13, a process of forming a stator coil 13 using a conventional bobbinless method, that is, processes of molding the stator coil 13; fixing and bonding the lower surface of the stator coil 13 on the stator support plate 13a; coating UV thermosetting resin on a number of portions of the lateral surface of the stator coil 13; and drying using ultraviolet rays, can be omitted. As a result, the processes of manufacturing the stator 10 for the aspiration motor 30 can be minimized and an inferiority which may occur by the existing manual processes can be solved.

Meanwhile, after the insulation wire has been wound around the bobbin 16 of the stator 10 to thus have formed the stator coil 13, it is desirable to fix UV thermosetting resin on a number of portions of the stator coil 13 (for example, three portions if the stator coil 13 is triangular) in order to prevent a wire loosening phenomenon of the stator coil 13.

In addition, when the stator 10 is injection-molded in the present invention, the bearing seat 14, the back yoke 15 and the hall element 20 are inserted at predetermined positions, respectively, and are molded in an insert-molding method using thermosetting resin.

That is, the circular bearing seat 14 is made to be located under the central hole 20a, and the hexagonal back yoke 15 and the hall element 20 are inserted at predetermined positions which are set according to a magnetic circuit. The circular bearing seat 14, the hexagonal back yoke 15 and the hall element 20 may be integrally molded in an insert-molding method using thermosetting resin.

Figure 6:
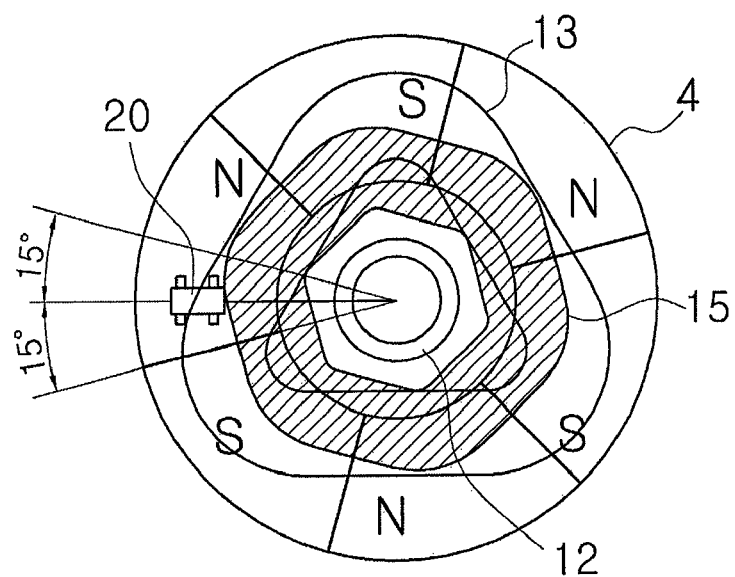
FIG. 6 is a diagram for explaining that a hall element and a back yoke are position-set up according to the present invention.

FIG. 6 is a diagram for explaining that a hall element and a back yoke are position-set up according to the present invention. Referring to FIG. 6, the back yoke 15 and the hall element 20 are position-set up in order to prevent the hall element 20 from being positioned at a dead point which is formed near the boundary surface of the magnet.

As an example, it is desirable to position-set up the hall element 20 at a position where the hall element 20 is shifted by about ¼ magnetic pole, that is, by 15 degrees from the corner of the back yoke and the boundary surface of the magnetic poles. The reason is because the strongest portion of a magnetic force is located near ¼ or ¾ portions from the magnetic boundary surfaces of the magnet 4a.

Thus, if the back yoke 15 and the hall element 20 are position-set up, and if drive of the aspiration motors 30 is stopped, the center of the magnet 4a is stopped at a point in place where an effective area width of the back yoke 15 (an area of an overlap portion of the magnet 4a and the back yoke 15) is the widest, that is, at an angle which is positioned so that the corner portion of the back yoke 15 is directed toward the center of the magnet 4a.

As a result, the hall element 20 is stopped at a position where the hall element 20 is shifted by about 15 degrees from the boundary surface of the magnetic poles automatically. Accordingly, the hall element 20 is prevented from being located at a dead point where the hall element 20 cannot detect polarity of the magnet 4a.

That is, when the stator 10 is injection-molded, the back yoke 15 and the hall element 20 are inserted into and injection-molded at predetermined positions. Accordingly, a bad starting phenomenon which occurs when the hall element 20 is positioned at a dead point can be prevented, and an inferiority which occurs when the stator coil 13 and the back yoke 15 are manually combined with each other can be prevented.

Meanwhile, when the stator support plate 13a is injection-molded, one or two of the bearing seat 14, the back yoke 15 and the hall element 20 are selectively inserted as necessary (for example, under the injection-molding process environment or under the manufacturing environment), to then perform an injection-molding process.

For example, only the bearing seat 14 and back yoke 15 may be inserted to thus injection-mold the stator support plate 13a, and the hall element 20 may be surface-mounted on the control PCB 31 according to the conventional method.

In the present invention, the case that the bearing seat 14, the back yoke 15 and the hall element 20 are all inserted and molded in the stator support plate 13a, has been described, but it can be seen that the case that only the part of the bearing seat 14, the back yoke 15 and the hall element 20 are inserted and injection-molded in an insert-molding method is not beyond the scope of the present invention.

In addition, only the bobbin 16 is formed in the stator 10, to thus form a stator coil 13, and then the bearing seat 14, the back yoke 15 and the hall element 20 are separately combined with the stator 10.

Figure 5D:
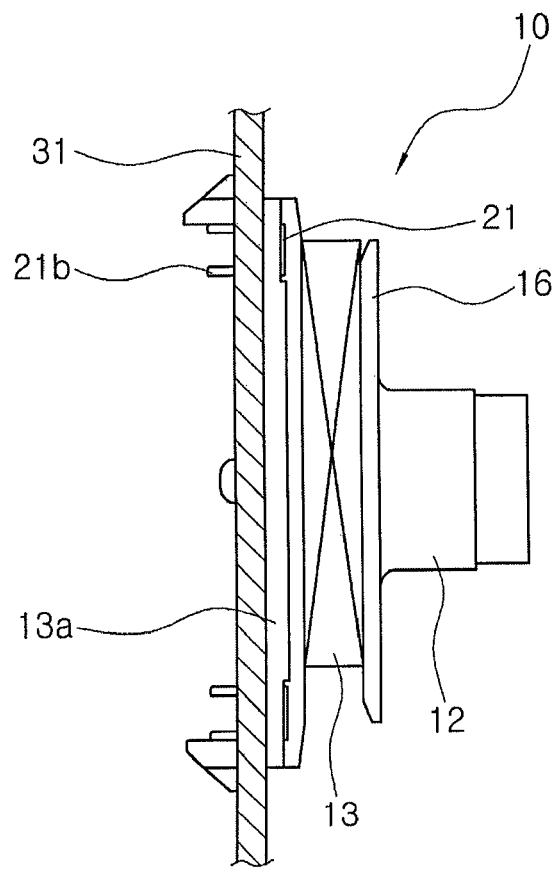
FIG. 5D is a cross-sectional view cut along a line D-D' of FIG. 5C.

Referring to FIGS. 5C and 5D, a pair of coil terminals 21 are combined with terminal insertion holes 20b which form a group with four holes in the stator support plate 13a, respectively.

The coil terminals 21 include four pins 21b which are respectively inserted into the terminal insertion holes 20b, and terminals 21a through which the start/end wires 13-1 and 13-2 which are withdrawn from the stator coil 13 can contact the upper portion of the stator support plate 13a.

In addition, the coil terminals 21 include four pins 21b which are bent and extended from a bar-shaped central plate, and terminals 21a having respective grooves so that the start/end wires 13-1 and 13-2 can be easily wound at one side of the central plate. The coil terminals 21 can be implemented using a conductor whose electrical characteristics are excellent.

It is desirable that the wire is soldered for preventing the wire from being loosened and maintaining the contact between the wires if the start/end wires 13-1 and 13-2 are wound around the terminals 21a of the coil terminals 21.

The coil terminals 21 are combined with the stator support plate 13a, to make the start/end wires 13-1 and 13-2 contact the terminals 21a, and to then be combined with the control PCB 31. The control PCB 31 supplies a drive signal to the stator coil 13 through the coil terminals 21.

The control PCB 31 preferably includes a number of throughholes through which the respective pins 21b of the coil terminals 21 can penetrate, a contact surface which can make the hall element 20 contact a printed circuit at an area corresponding to the position of the hall element 20, and a contact hole which can connect the hall element 20 with the printed circuit.

Here, a method of connecting the hall element 20 with the printed circuit using a jump wire or a method of wiring a printed circuit on the upper surface of the control PCB 31 and connected the lower surface of the hall element 20 directly with the printed circuit, is used as a method of connection the hall element with the printed circuit of the control PCB 31. It can be seen that even the case of connecting the hall element with the printed circuit of the control PCB 31 using a method of connecting elements with the printed circuit of the PCB is not beyond the technical scope of the present invention.

In addition, if lengths of the pins 21b of the coil terminals 21 are formed greater than thickness of the control PCB 31, and the pins 21b are inserted in the throughholes of the control PCB 31, a predetermined size of portions are protruded, so that the pins 21b may easily contact the printed circuit.

Therefore, after the pins 21b of the coil terminals 21 have been combined with the terminal insertion holes 20b of the stator support plate 13a, the start/end wires 13-1 and 13-2 are withdrawn from the stator coil 13, and then the withdrawn start/end wires 13-1 and 13-2 are wound around the terminals 21a of the coil terminals 21, respectively, and the pins 21b of the coil terminals 21 are soldered to connect the start/end wires 13-1 and 13-2 with the control PCB 31.

As a result, the existing difficult manual processes of withdrawing the start/end wires 13-1 and 13-2 from the stator coil and making the withdrawn start/end wires 13-1 and 13-2 contact the control PCB vie the throughholes of the stator support plate 13a, can be omitted. A possibility of disconnection of the wires can be greatly reduced, to thereby enhance a productivity of a stator for an aspiration motor and lower an inferiority therefor.

As described above, the case of the aspiration motor which is used for a general car ventilation system has been described, but the present invention can be identically applied for motors which are used for the other purposes.

[Mode For Invention]

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

[Industrial Applicability]

As described above, the present invention can be applied to a stator for an aspiration motor, an aspiration motor and an in-car sensor using the same, in which an inexpensive insulation wire can be used to thus manufacture a stator at low cost, and a bearing seat, a back yoke and a hall element are integrally injection-molded in an insert-molding method, to thus simplify a manufacturing process and enhance a productivity.

The invention claimed is:

1. A stator for an aspiration motor, the stator comprising:
a stator support plate;
a support boss integrally formed on the stator support plate, the support boss vertically extended from a central portion of the stator support plate for receiving a shaft;
a bobbin integrally formed on the support boss, the bobbin laterally extended from the support boss and displaced from an upper side surface of the stator support plate to define a space therebetween; and
a stator coil including a wire wound in the space provided by the bobbin.

2. The stator according to claim 1, further comprising:
a bearing seat which is inserted into the stator support plate, and is located at the lower portion of a central hole which is formed in the support boss, to thereby isolate a sealing at lower portion of the central hole;
a back yoke which is located on the outer circumference of the bearing seat and forms a magnetic circuit; and
a hall element whose position is set so as to be shifted by ¼ from the corner of the back yoke and the boundary surface of polarity.

3. The stator according to claim 1 or 2, wherein the stator support plate is formed by position-setting, inserting and molding at least one of the bearing seat, the back yoke and the hall element, in an insert-molding method using thermosetting resin.

4. The stator according to claim 1 or 2, further comprising: a sleeve which is installed in the inside of the central hole formed in the support boss and grease which is filled between the sleeve and the bearing seat.

5. The stator according to claim 1, wherein a number of parts are fixed for preventing an insulation wire from being loosened at a state where the insulation wire is wound in the space provided by the bobbin.

6. The stator according to claim 1, wherein the stator support plate comprises a number of terminal insertion holes which can be respectively combined with coil terminals at one side portion of the stator support plate, and wherein each of the coil terminals comprises: a number of pins which are penetratively combined with the terminal insertion holes, and which are soldered and connected to a control printed circuit board (PCB) which is combined with the bottom surface of the stator support plate; and a terminal having grooves which are respectively extended from the pins in order to connect the start/end wires withdrawn from the stator coil.

7. A stator for an aspiration motor, the stator comprising:
a stator support plate in which a number of terminal insertion holes are formed in first and second areas, respectively, a bearing seat positioned at the lower central portion of the stator support plate, a back yoke located on the outer circumference of the bearing seat, wherein the back yoke and a hall element is inserted in the stator support plate at predetermined positions according to a magnetic circuit formed by the back yoke;
a support boss integrally formed on the stator support plate, the support boss vertically extended from the central portion of the stator support plate for receiving a shaft;
a bobbin integrally formed on the support boss, the bobbin laterally extended from the support boss and displaced from an upper side surface of the stator support plate to define a space therebetween;
a stator coil including a wire wound in the space provided by the bobbin; and
a control printed circuit board (PCB) disposed at the bottom surface of the stator support plate to supply a drive signal to the stator coil.

8. The stator according to claim 7, further comprising a pair of coil terminals at the upper portion of which start and end wires withdrawn from the stator coil are fixed, and at the lower portion of which the respective terminal insertion holes are connected and the control PCB is connected.

9. An aspiration motor comprising:
a rotor in which an impeller and a shaft are integrally formed with a magnet, and which inhales and exhales air according to rotation of the magnet and the impeller; and
a stator comprising:
a stator support plate oppositely disposed to the rotor;
a support boss integrally formed on the stator support plate, the support boss vertically extended from the central portion of the stator support plate for receiving a shaft;
a bobbin integrally formed on the support boss, the bobbin laterally extended from the support boss and displaced from an upper side surface of the stator support plate to define a space therebetween; and
a stator coil including a wire wound in the space provided by the bobbin.

10. The stator according to claim 9, wherein the stator comprises:
a circular bearing seat which is located at a lower portion of a central hole formed in the support boss;
a hexagonal back yoke which is located on the outer circumference of the bearing seat and which forms a magnetic circuit; and
a hall element whose position is set up according to the magnetic circuit.

11. The stator according to claim 10, wherein the stator is integrally formed by injection-molding at least one of the bearing seat, the back yoke and the hall element, in an insert-molding method on the stator support plate.

12. The stator according to claim 9, further comprising:
first and second coil terminals having a number of pins which are penetrated through a number of terminal insertion holes which are provided on the stator support plate, and terminals around which start and end wires which are withdrawn from the stator coil are wound; and
a control printed circuit board (PCB) which is combined with the bottom surface of the stator support plate and supplies a drive signal for the stator coil, wherein each pin is connected with the control PCB which is combined with the bottom surface of the stator support plate by soldering, and the drive signal supplied by the control PCB is applied to the stator coil.

13. An in-car sensor comprising:

a rotor in which an impeller and a shaft are integrally formed with a magnet, and which inhales and exhales car indoor air according to rotation of the magnet and the impeller;

a stator comprising:
- a stator support plate oppositely disposed to the rotor;
- a support boss integrally formed on the stator support plate, the support boss vertically extended from the central portion of the stator support plate for receiving a shaft;
- a bobbin integrally formed on the support boss, the bobbin laterally extended from the support boss and displaced from an upper side surface of the stator support plate to define a space therebetween; and
- a stator coil including a wire wound in the space provided by the bobbin;

a control printed circuit board (PCB) disposed at the bottom surface of the stator support plate to supply a drive signal to the stator coil;

a housing fixedly connected to a car for forming an external appearance, and which has an air-stream path from an inlet of the leading end of the housing to an outlet formed at the lateral surface thereof, the housing having upper and lower housings which fix the control PCB therebetween;

a temperature sensor which is positioned in the air-stream path through which air is inhaled by the rotor; and a signal PCB which transfers a signal detected by the temperature sensor to a controller of the car.

14. The in-car sensor according to claim 13, further comprising a signal terminal which is connected with the signal PCB and which transfers the signal detected by the temperature sensor to the controller of the car.

15. The in-car sensor according to claim 14, wherein the signal terminal comprises a number of terminal pins each of which one side is connected with the signal PCB and other side is connected with the controller, to thus transfer the signal detected by the temperature sensor to the controller; and a fixing member for integrally fixedly supporting the signal terminal to the in-car sensor.

16. The in-car sensor according to claim 15, wherein the lower housing comprises connector insertion grooves into which a 6-pin connector can be easily combined, in which the 6-pin connector is connected with the controller at an area through which each terminal pin of the signal terminal is penetrated and protruded.

* * * * *